United States Patent
Massarella et al.

(10) Patent No.: US 9,749,063 B2
(45) Date of Patent: Aug. 29, 2017

(54) RF SIGNAL GENERATING DEVICE

(71) Applicant: CRFS Limited, Cambridge, Cambridgeshire (GB)

(72) Inventors: Alistair Massarella, Cambridge (GB); Stewart Hyde, Cambridge (GB); Daniel Timson, Cambridge (GB); Steven Williamson, Cambridge (GB)

(73) Assignee: CRFS Limited, Cambridge (GB)

( * ) Notice: Subject to any disclaimer, the term of this patent is extended or adjusted under 35 U.S.C. 154(b) by 0 days.

(21) Appl. No.: 14/891,883

(22) PCT Filed: Apr. 30, 2014

(86) PCT No.: PCT/GB2014/051328
§ 371 (c)(1),
(2) Date: Nov. 17, 2015

(87) PCT Pub. No.: WO2014/184519
PCT Pub. Date: Nov. 20, 2014

(65) Prior Publication Data
US 2016/0142159 A1    May 19, 2016

Related U.S. Application Data

(63) Continuation of application No. 13/897,066, filed on May 17, 2013, now Pat. No. 9,397,761.

(30) Foreign Application Priority Data

May 17, 2013   (GB) .................................. 1308972.7

(51) Int. Cl.
*H04B 17/00*     (2015.01)
*H04W 52/42*     (2009.01)
(Continued)

(52) U.S. Cl.
CPC ............ *H04B 17/00* (2013.01); *H04B 17/104* (2015.01); *H04B 17/11* (2015.01); *H04B 17/391* (2015.01); *H04W 52/42* (2013.01)

(58) Field of Classification Search
CPC ...... H04B 17/00; H04B 17/104; H04B 17/11; H04B 17/391
(Continued)

(56) References Cited

U.S. PATENT DOCUMENTS 4,977,607 A    12/1990   Maucksch et al.
5,355,519 A    10/1994   Hasegawa
(Continued)

FOREIGN PATENT DOCUMENTS

EP    0845885 A2    6/1998
EP    0845885 A3    7/2000
(Continued)

OTHER PUBLICATIONS

Agilent, "MIMO Channel Modeling and Emulation Test Challenges," Application Note, Jan. 22, 2010. Downloaded from http://cp.literature.agilent.com/litweb/pdf/5989-8973EN.pdf on Nov. 20, 2013.
(Continued)

Primary Examiner — Wesley Kim
Assistant Examiner — Raj Chakraborty
(74) Attorney, Agent, or Firm — McCarter & English, LLP; David R. Burns

(57) ABSTRACT

Apparatus for generating an RF signal for use in RF signal detection is described. The apparatus comprises at least one processor configured to generate a set of IQ data based on at least one set of weighted IQ data, each set of weighted IQ data having a respective weight and a circuit configured to generate an RF signal using the set of IQ data. The at least one processor is configured to calculate each respective
(Continued)

weight in dependence upon location of a signal detector or an antenna associated with the RF signal detector.

29 Claims, 8 Drawing Sheets

(51) Int. Cl.
    *H04B 17/391*     (2015.01)
    *H04B 17/10*     (2015.01)
    *H04B 17/11*     (2015.01)

(58) Field of Classification Search
    USPC .................................................... 455/67.11
    See application file for complete search history.

(56) References Cited

U.S. PATENT DOCUMENTS

| | | | |
|---|---|---|---|
| 5,434,883 A | 7/1995 | Kimoto et al. | |
| 5,862,455 A | 1/1999 | Martin et al. | |
| 6,259,747 B1* | 7/2001 | Gustafsson | H04L 27/2071 332/103 |
| 6,337,975 B1* | 1/2002 | Coan | H04B 1/3877 455/129 |
| 7,432,856 B1* | 10/2008 | Hornbostel | G01S 1/028 342/169 |
| 8,090,062 B2 | 1/2012 | Sankabathula et al. | |
| 8,947,294 B1 | 2/2015 | Wasiewicz et al. | |
| 9,397,761 B2* | 7/2016 | Massarella | H04B 17/00 |
| 2002/0072344 A1* | 6/2002 | Souissi | H04B 1/123 455/296 |
| 2003/0156664 A1 | 8/2003 | Sahai et al. | |
| 2004/0171385 A1 | 9/2004 | Haustein et al. | |
| 2005/0125141 A1* | 6/2005 | Bye | G01S 19/47 701/469 |
| 2006/0239377 A1* | 10/2006 | McCoy | H04L 27/2071 375/295 |
| 2007/0161898 A1 | 7/2007 | Hao et al. | |
| 2007/0263748 A1 | 11/2007 | Mesecher | |
| 2008/0079583 A1* | 4/2008 | Alexis | H04B 5/0062 340/572.1 |
| 2008/0111758 A1* | 5/2008 | Griffiths | H01Q 19/19 343/837 |
| 2009/0086833 A1 | 4/2009 | Chalmers et al. | |
| 2010/0156438 A1* | 6/2010 | Gorin | G01R 23/16 324/624 |
| 2011/0150066 A1 | 6/2011 | Fujimoto | |
| 2011/0268037 A1 | 11/2011 | Fujimoto | |
| 2012/0230372 A1 | 9/2012 | Park et al. | |
| 2012/0295538 A1* | 11/2012 | Arcidiacono | H04B 7/18513 455/13.4 |
| 2013/0018529 A1* | 1/2013 | Ploschnitznig | H04B 7/18563 701/2 |
| 2013/0051329 A1* | 2/2013 | Take | H04W 80/02 370/328 |
| 2013/0252568 A1 | 9/2013 | Woodsum | |
| 2013/0321206 A1 | 12/2013 | Chang | |
| 2014/0140382 A1 | 5/2014 | Azary | |
| 2015/0050030 A1 | 2/2015 | Le Taillandier De Gabory | |
| 2015/0071390 A1 | 3/2015 | Muhammad | |

FOREIGN PATENT DOCUMENTS

| | | |
|---|---|---|
| EP | 1578032 A1 | 9/2005 |
| EP | 1763148 A1 | 3/2007 |
| EP | 1783148 A1 | 5/2007 |
| GB | 898055 A | 6/1962 |
| JP | H06-140950 A | 5/1994 |
| JP | 2001091633 A | 4/2001 |
| WO | 94/29975 A1 | 12/1994 |

OTHER PUBLICATIONS

Anritsu Product Introduction for MF6900A Fading Simulator, Nov. 25, 2010, 22 pages. Downloaded from http://www.anritsu.com/en-AU/test-measurement/support/downloads?model=MF6900A, last accessed Nov. 16, 2014.
Conus, F., "High-Performance Arbitrary Waveform Generation for RADAR and LIDAR Application," Agilent Application Note, Feb. 17, 2010. Downloaded from http://www.home.agilent.com/en/pd-742457-pn-N8241A/arbitrary-waveform-generator-synthetic-instrument-module-15-bit-125-gs-s-or-625-ms-s?&cc=GB&lc=eng on Nov. 18, 2013.
International Search Report and Written Opinion issued in International Application No. PCT/GB2014/051328, dated Jun. 2, 2014.
Jue, G., "COTS Gear Generates Multi-Emitter Test Signals," Defense Electronics Magazine, Sep. 27, 2012. Downloaded from http://defenseelectronicsmag.com/systems-amp-subsystems/cots-gear-generates-multi-emitter-test-signals on Nov. 18, 2013.
Mercade, J., "Complex Modulation Generation with Low-Cost Arbitrary Waveform Generators," Agilent White Paper, Aug. 27, 2012. Downloaded from http://cp.literature.agilent.com/litweb/pdf/5991-1100EN.pdf on Nov. 20, 2013.
Office Action issued in U.S. Appl. No. 13/897,066, dated Nov. 3, 2015.
Search and Examination Report issued in corresponding United Kingdom application No. GB1308972.7, dated Nov. 21, 2013, 3 pages.
U.S. Appl. No. 13/897,066, filed May 17, 2013.

\* cited by examiner

RF SIGNAL GENERATING DEVICE

FIELD OF THE INVENTION

The present invention relates to a device for generating an RF signal for use in RF signal detection. In particular, the device can be used for training operators of RF signal detection equipment.

BACKGROUND

Devices which can detect and measure radio frequency (RF) signals can be used in a variety of different applications including spectrum management and security. For example, RF signal detection equipment having a direction finding capability can be used to identify and locate RF sources (herein referred to as "RF transmitters").

Operators (or "users") need to be trained to use such types of devices. However, there are considerable challenges to providing these users with effective field training. For instance, RF sources need to be deployed and configured, and be operated in a controlled manner. This may be onerous, time consuming and/or complex, particularly if sources are mobile and frequencies need to be coordinated. Moreover, it may be necessary to procure a license to operate sources which may be costly to obtain and/or which might place tight restrictions on operation. In some cases, licenses may be unavailable.

SUMMARY

According to a first aspect of the present invention there is provided apparatus comprising at least one processor configured to generate a set of IQ data based on at least one set of weighted IQ data, the or each set of weighted IQ data having a respective weight, and a circuit configured to generate an RF signal using the set of IQ data. The at least one processor is configured to calculate each respective weight in dependence upon location of an RF signal detector or an antenna associated with the RF signal detector. The location may be an actual location or a simulated location. The location of the apparatus may be used as the location.

Each set of weighted IQ data can be used to generate data for simulating a respective wireless RF transmitter. However, the RF signal can be supplied to an RF signal detector by a wired connection. Thus, the apparatus can be used to emulate an RF signal which an RF signal detector would receive in a real environment in which there are a number of RF sources. Accordingly, the apparatus can be used to train an operator of the RF signal detector without the need for using real test RF sources. Furthermore, it can allow greater flexibility during training, for example, by allowing the number, type and/or characteristics of the simulated (or "virtual") RF sources to be easily controlled.

The apparatus may comprise a positioning device, such as a GPS receiver, for providing the location. The apparatus may comprise an interface for receiving an indication of the location (for example, a selection made using a pointer on a map or a set of coordinates) and/or an instruction modifying the location (for example, applying an offset). The interface may receive the indication from a remote location. The interface may be a user interface for receiving the indication or instruction locally.

The location of the apparatus may be used as the location of the RF signal detector, the antenna associated with the RF signal detector and/or the substitute device.

The at least one processor may be configured to calculate each respective weight in dependence upon location of a respective wireless RF transmitter being simulated. The apparatus may comprise an interface for receiving an indication of the locations of the wireless RF transmitter being simulated (for example, a selection made using a pointer on a map or a set of coordinates) and/or an instruction modifying the location of the wireless RF transmitters being simulated (for example, applying an offset). The interface may receive the indication from a remote location. The interface may be a user interface for receive the indication or instruction locally.

The at least one processor may be configured to calculate each respective weight in dependence upon orientation of the antenna. The apparatus may comprise an input for receiving antenna orientation.

The location and/or orientation may be fed back to the device and the at least one processor can generate new weights in dependence upon the location and/or orientation.

Thus, as an operator moves and/or re-orientates the antenna, the device responds in real time.

The antenna may be a handheld antenna. The antenna is preferably a directional antenna. The antenna may be associated with the RF signal detector by virtue of being operatively connected to the RF signal detector. Thus, even if the antenna provides a received RF signal, the RF signal detector need not use or may discard the received RF signal. The antenna may be associated with the RF signal detector by virtue of being tethered to the RF signal detector. For example, a cable (e.g. a co-axial cable) may be replaced by an electrically-insulating lead (or "dummy lead") or an in-line isolator. Thus, the antenna, even if it is capable of providing an RF signal, need not provide the received RF signal to the RF signal detector. The antenna may be a dummy antenna (or "substitute antenna" or "substitute device"). Thus, the dummy antenna may not even be capable of receiving and providing an RF signal to the RF signal detector. The dummy antenna may be handheld. The antenna, which may be a dummy antenna, may comprise an orientation determining device, such as a gyroscope. Thus, the antenna or the dummy antenna may mimic a directional antenna.

The RF signal may lie in a range between 10 kHz (or less) to 100 GHz (or more).

The wired connection may be a co-axial cable. The wired connection may be RF over fiber.

The at least one processor may be configured to calculate a gain and select a frequency band which results in an RF signal having characteristics (such as power and frequency) simulating an aggregated RF signal resulting from one or more typical, in-range RF sources.

An RF source may be a mobile communication device, such as smart phones and feature phones. An RF source may be a wireless data modem, such that used in IEEE 802.11 and other wireless local area networks, and in Bluetooth and other wireless personal local area networks. An RF source may be a mobile data modem, such as that used in GSM, EDGE, UMTS, HSPA and/or other mobile networks. An RF source may be a GPS jammer. An RF source may be a communications system jammer. An RF source may be an AM or FM radio transmitter. An RF source may be an eavesdropping device having a wireless transmitter.

An environment comprising a mixture of RF sources and/or which may include one or more of the same type of RF source may be simulated. The number, type, location and/or characteristics of RF sources may change over time.

The RF source may be a reflector or scatterer. Thus, the RF signal being simulated may result from scattering of RF transmissions from a radar transmitter and so the RF source may be a target for radar detection and/or other parts of the physical environment (i.e. clutter). Such radars can be monostatic, bistatic or multistatic.

The at least one processor may be configured to generate a set of IQ data based on at least two sets of weighted IQ data by linearly combining the at least two sets of weighted IQ data.

The at least one processor may be configured to calculate each respective weight.

A weight may be a real number. The at least one processor may be configured to multiply each value in the set of IQ data by the respective weight.

A weight may be a complex number. The at least one processor may be configured to multiply each IQ pair in the set of IQ data by the respective complex weight.

The apparatus may further comprise a positioning device for providing a position (such as the position of the antenna of signal detector, which can be assumed in many cases to be the same as the signal detector and the signal generator) and the at least one processor may be configured to calculate each respective weight in dependence upon the position. The positioning device may be a global positioning system (GPS) device or other satellite- or ground-based navigation system device. The positioning device may be an inertial navigation system (INS) device. The positioning device may include a user interface which allows the operator to manually enter or select a position (for example, in the form of coordinates). The positioning device may be an interface for receiving, from a remote location, the position or data for enabling the position to be determined (e.g. the data may be carried by one or more timing beacons).

The apparatus may further comprise a first database storing data relating to propagation models and terrain. The propagation models may include one or more of, for example, a free space model, a ground reflection (two-ray) model, a knife-edge diffraction model, a Hata model, a Longley-Rice model, an Okumura model, statistical multipath models. The at least one processor may be configured to calculate each respective weight in dependence upon a propagation model and terrain.

The apparatus may further comprise a second database storing data relating to antenna characteristics, such as, for example, gain of the antenna which is connected to the signal detector. The gain may depend on direction and frequency. The at least one processor may be configured to calculate each respective weight in dependence upon said antenna characteristics.

The apparatus may further comprise a third database storing data relating to characteristics of a plurality of RF sources. The at least one processor may be configured to calculate each respective weight in dependence upon characteristics of the respective RF source. The characteristics may include a transmit power, an antenna gain and/or position. A position and/or other characteristics may depend on time, i.e. the RF source may be mobile and may change over time.

The apparatus may comprise a synthesiser configured to generate a set of (un-weighted) IQ data. The IQ data may take the form of a time series of I and Q data values. The at least one processor may be configured to receive the set of IQ data from the synthesiser and to apply a corresponding weight. Additionally or alternatively, the apparatus may comprise fourth database storing at least one set of IQ data. The IQ data may take the form of recorded IQ data. The at least one processor may be configured to retrieve the set of IQ data from the fourth database and to apply a corresponding weight.

The circuit may comprise a pair of digital-to-analog converters (DAC). The DACs may be configured to receive the IQ data (i.e. digital samples of I and Q components) and to output analog I and Q signals. The circuit may comprise a modulator. The modulator may be configured to receive the analog I and Q signals from the DACs and to modulate the RF carrier signal.

The set of IQ data may be a first set of IQ data and the circuit may be a first circuit which is configured to receive the first set of IQ data, a first gain and a first frequency band and to generate a first RF signal in the first frequency band. The at least one processor may be configured to generate a second set of IQ data based on at least one set of weighted IQ data. The apparatus may further comprise a second, different circuit configured to receive the second set of IQ data, a second gain and a second frequency band which is different to the first frequency band and to generate a second RF signal in the second frequency band. Thus, the apparatus may be able to generate RF signals in different bands.

The apparatus may comprise more than two circuits, each circuit providing a respective RF signal in a different frequency band. The circuits may be distinct or separate, but of the same type.

The apparatus may further comprise an RF signal combiner which is configured to receive first and second RF signals (or more than two RF signals) and to combine the RF signals. Thus, the apparatus can be used to provide a multi-band RF signal. The apparatus may comprise a port for supplying the multi-band RF signal to a wired connection.

The apparatus may comprise a port (or ports) for supplying the RF signal (respective RF signals) to a wired connection. Thus, the apparatus can provide single-band RF signals.

The apparatus may comprise an amplifier for amplifying the RF signal.

The apparatus may comprise an antenna for transmitting the RF signal wirelessly.

The apparatus may further comprise an input for receiving antenna orientation data. The antenna orientation data may include bearing (or "azimuth") data, elevation (or "inclination") data and/or rotation data. The at least one processor may be configured to calculate each respective weight in dependence upon the antenna orientation. The apparatus may further comprise a device configured to provide the antenna orientation data which is attached to an antenna or an antenna substitute.

The apparatus may further comprise an interface configured to receive instructions from a remote location for controlling operation of the apparatus. The interface may include a wireless data modem or mobile network modem. The apparatus may comprise or may further comprise an interface configured to provide information on performance, for example, of the operator.

The apparatus may further comprise an interface configured to provide a reference sequence for supplying to a signal generator. The signal processor may be configured to generate the set of IQ data so as to simulate a signal that would have been received from a virtual test transmitter including a time delay corresponding to a distance between the virtual test transmitter and the signal detector. Thus, the apparatus may be used for time difference on arrival (TDOA) training.

According to a second aspect of the present invention there is provided a system comprising the apparatus and a signal detector. The signal detector may be in wired connection with the apparatus. A path between an RF signal output of the apparatus and an RF signal input of the signal detector need not include a wireless section.

The system may further comprise an antenna. The antenna may be a handheld antenna. The antenna is preferably a directional antenna. The antenna may be operatively connected to the RF signal detector. The antenna may be tethered to the RF signal detector. The antenna may be a dummy. The antenna may comprise an orientation determining device, such as a gyroscope.

The signal detector may comprise a spectrum analyser. The signal detector may comprise a RF power detector or a tunable RF power detector. The signal detector may comprise an RF receiver. The signal detector may comprise wideband RF detector. The signal detector may comprise a radar receiver (i.e. for target detection). The signal detector may comprise a radar warning receiver. The signal detector may comprise signal recorder. The signal detector may comprise a digitising receiver.

The signal detector and apparatus may be comprised in a single unit. Thus, a signal detector may be provided with an in-built training module.

The signal detector may include an interface for receiving instruction from a remote location for controlling operation of the apparatus and/or signal detector, and/or for transmitting information on performance.

The signal generator may include an interface configured to provide a reference sequence for supplying to the signal detector and the signal processor is configured to generate the set of IQ data so as to simulate a signal that would have been received from a virtual test transmitter including a time delay corresponding to a distance between the virtual test transmitter and the signal detector. The signal detector may be configured to carry out a correlation measurement for a time difference on arrival (TDOA) measurement.

According to a third aspect of the present invention there is provided apparatus comprising a signal generating part which includes at least one processor configured to generate a set of IQ data based on at least one set of weighted IQ data, the or each set of weighted IQ data having a respective weight and signal detecting part which includes at least one processor configured to provide a signal to a user interface based on the set of IQ data. The user interface may include a display.

Thus, weighted IQ data can be used to generate data for simulating a respective wireless RF transmitter without the need for generating an RF signal.

According to a fourth aspect of the present invention there is provided a system comprising at least two apparatuses and at least two signal detectors. Each signal detector may be in wired connection with a respective apparatus. Each apparatus may be configured to simulate the same environment. For example, each apparatus may be provided with and process the same data but with different detector positions and same transmitter positions. This can allow team training and permit, for example, operators to cooperate and triangulate the position of a virtual RF source.

According to a fifth aspect of the present invention there is provided a method comprising generating a set of IQ data based on at least one set of weighted IQ data, each set of weighted IQ data having a respective weight and generating an RF signal using the set of IQ data, and calculating each respective weight in dependence upon location of an RF signal detector or an antenna associated with the RF signal detector. The location may be an actual location or a simulated location.

The method may comprise calculating each respective weight in dependence upon location of a respective wireless RF transmitter being simulated.

The method may further comprise calculating each respective weight.

According to a sixth aspect of the present invention there is provided a computer program which, when executed by one or more processors, causes the one or more processors to perform the method.

According to a seventh aspect of the present invention there is provided a non-transitory computer readable medium storing a computer program which, when executed by one or more processors, causes the one or more processors to perform the method.

According to an eighth aspect of the present invention there is provided a hardware logic circuit configured to perform the method.

According to a ninth aspect of the present invention there is provided a method of training an operator of a signal detector, the method comprising using a signal generator to provide a signal to the signal detector which emulates an RF signal which the signal detector would receive in a real environment comprising at least one real wireless RF source. The signal generator is configured to generate the signal in dependence upon location of the signal detector, an antenna associated with the signal detector. The location may be an actual location or a simulated location. The location of the apparatus may be used as the location.

The method may comprise supplying a location of the signal detector to the signal detector and/or supplying a location of each signal detector to the signal detector.

Thus, a trainer can set or change the location of the detector and/of the sources to help test the operator.

The method may comprise supplying an orientation of an antenna to the signal detector.

According to a tenth aspect of the present invention there is provided a method of testing a signal detector, the method comprising using a signal generator to provide a signal to the signal detector which emulates an RF signal which the signal detector would receive in a real environment comprising at least one real wireless RF source.

BRIEF DESCRIPTION OF THE DRAWINGS

Certain embodiments of the present invention will now be described, by way of example, with reference to the accompanying drawings, in which.

DETAILED DESCRIPTION OF CERTAIN EMBODIMENTS

Figure 1:
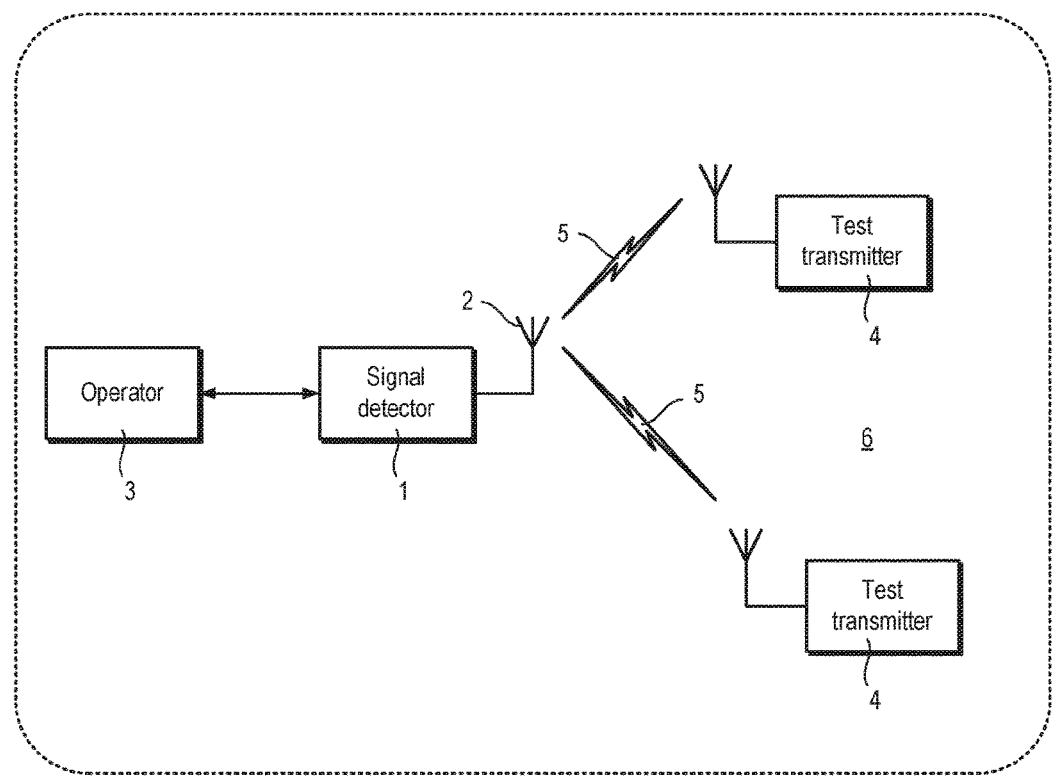
FIG. 1 schematically illustrates training an operator of an RF signal detector using remote RF sources which transmit wireless RF signals.

Referring to FIG. 1, a radio frequency (RF) signal detector 1 is shown. The RF signal detector 1 can take the form of spectrum analyser. The RF signal detector 1 is coupled to an antenna 2 thereby allowing the RF signal detector 1 to detect wireless RF signals.

As shown in FIG. 1, a user 3 (herein referred to as an "operator" or "trainee") can be trained by an instructor (not shown) to use the signal detector 1 by employing one or more test transmitters 4 which transmit respective wireless RF signals 5 located in a surrounding area 6.

The area 6 may be an enclosed space, such as building, installation, vehicle or vessel, or part of a building, installation, vehicle or vessel. The area 6 may be semi-enclosed or bounded, such as a stadium or street. The area 6 may be open, such as open ground. The area 6 may be mixture of different types of spaces. The area 6 may include land and/or sea.

Figure 2:
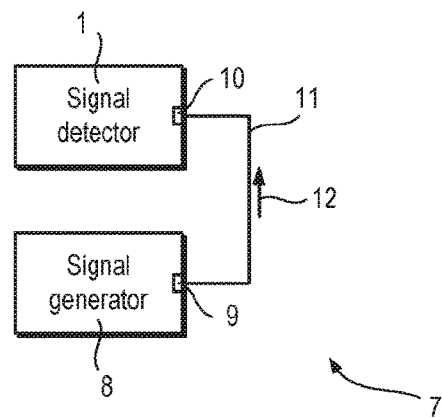
FIG. 2 schematically illustrates training an operator of a signal detector using an RF signal generator which provides an RF signal to an RF signal detector via a wired connection.

Referring to FIG. 2, a training system 7 is shown. The training system 7 includes the signal detector 1 and an RF signal generator 8. An RF output 9 of the signal generator 8 is coupled to an RF input 10 of the signal detector 1 via a wired connection 11 (such as a co-axial cable) to supply an RF signal 12 directly to the signal detector 1.

The signal generator 8 does not need to transmit a wireless RF signal. Thus, the signal generator 8 may be one which is only capable of transmitting low-power RF signals, for example, in a range of −150 dBm to +10 dBm. However, the signal generator 8 may be one which is capable of transmitting RF signals at a higher power, e.g. greater than +10 dBm.

As shown in FIG. 2, no wireless test transmitters 4 (FIG. 1) need be used.

Figure 3:
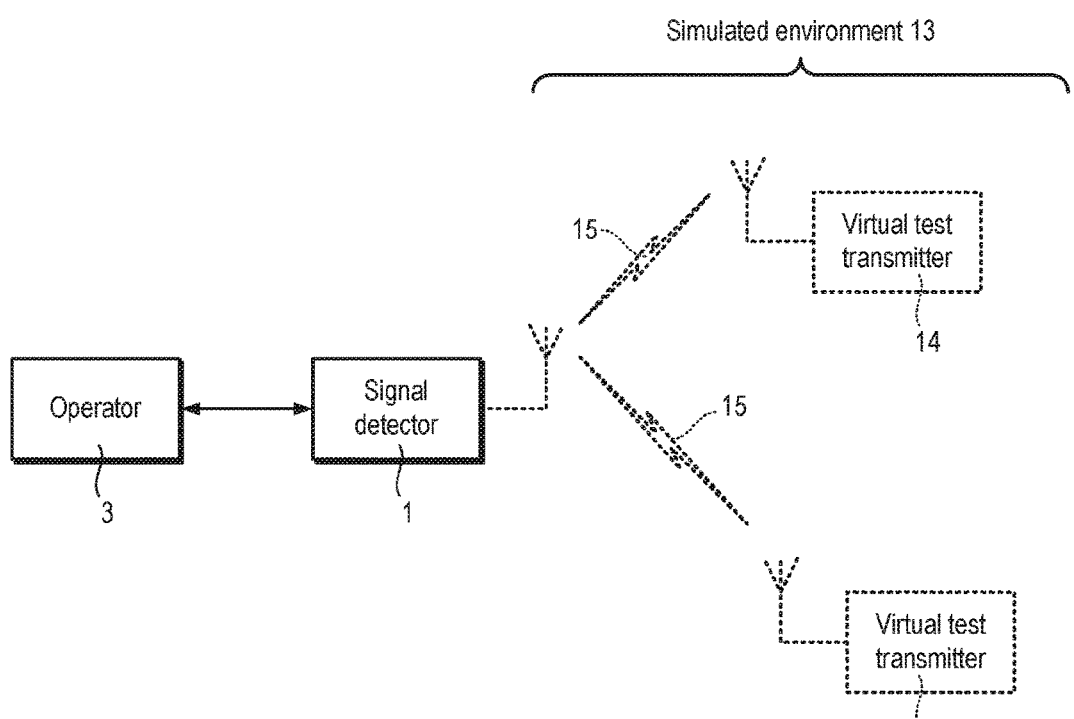
FIG. 3 schematically illustrates virtual test transmitters simulated using the RF signal generator shown in FIG. 2.

Referring also to FIG. 3, the training system 7 can be used to provide an apparent signal environment (or "simulated environment") 13 which includes one or more simulated RF test transmitters 14 (herein referred to as "virtual test transmitters") transmitting simulated wireless RF signals 15.

The virtual test transmitters 14 do not physically exist. However, the signal generator 8 imitates the signal environment that the virtual test transmitters 14 would have produced at the RF input of the signal detector 1 if they were real. Thus, the signal generator 8 can help circumvent the need for using real test transmitters 4 (FIG. 1).

Each virtual test transmitter 14 may be fixed or mobile. The signal generator 8 can mimic the signal environment as it would appear to the signal detector 1 at a particular position, $p_d$. The signal detector position may include latitude and longitude (or other set of two-dimensional coordinates) and, optionally, height.

Figure 9:
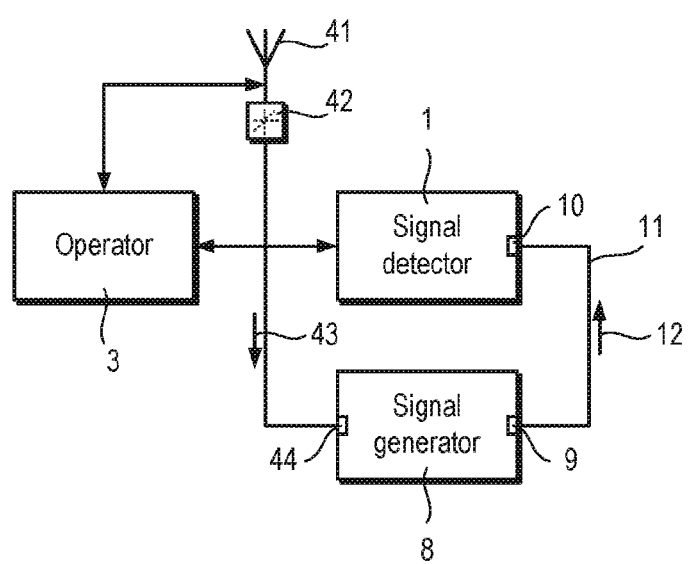
FIG. 9 schematically illustrates a RF signal generator receiving antenna orientation data.

As will be explained in more detail later, the signal generator 8 can simulate changes in signal strength resulting from changes in orientation of a real, but non-operational directional antenna or substitute device 41 (FIG. 9). The signal generator 8 can play back previously recorded signals. The signal generator 8 can be controlled from a remote station 36 (FIG. 6) by an instructor 38 (FIG. 6) and so vary the signal environment presented to the operators 3.

The training system 7 may be used for training and/or assessing operators 3 in techniques of signal detection, direction finding (or "transmitter geolocation"), signal identification and eavesdropping. The system 7 can be used in-the-field, for example, in an area of the type in which the signal detector 1 would typically be used.

The signal generator 8 may be portable. However, the signal generator 8 may be semi-portable (i.e. capable of being moved by, for example one or two persons, but is not intended for ready transportation) or mounted to a vehicle (such as a truck) or fixed platform. The sensing equipment 1 may be portable, semi-portable, or mounted to a vehicle or fixed platform.

The sensing equipment 1 need not be specially-adapted other than by replacing a connection to the antenna 2 (FIG. 1) by the wired connection 11. Thus, the signal generator 8 can be used with an existing signal detector 1, for example, detection equipment that a customer already has in service.

Figure 4:
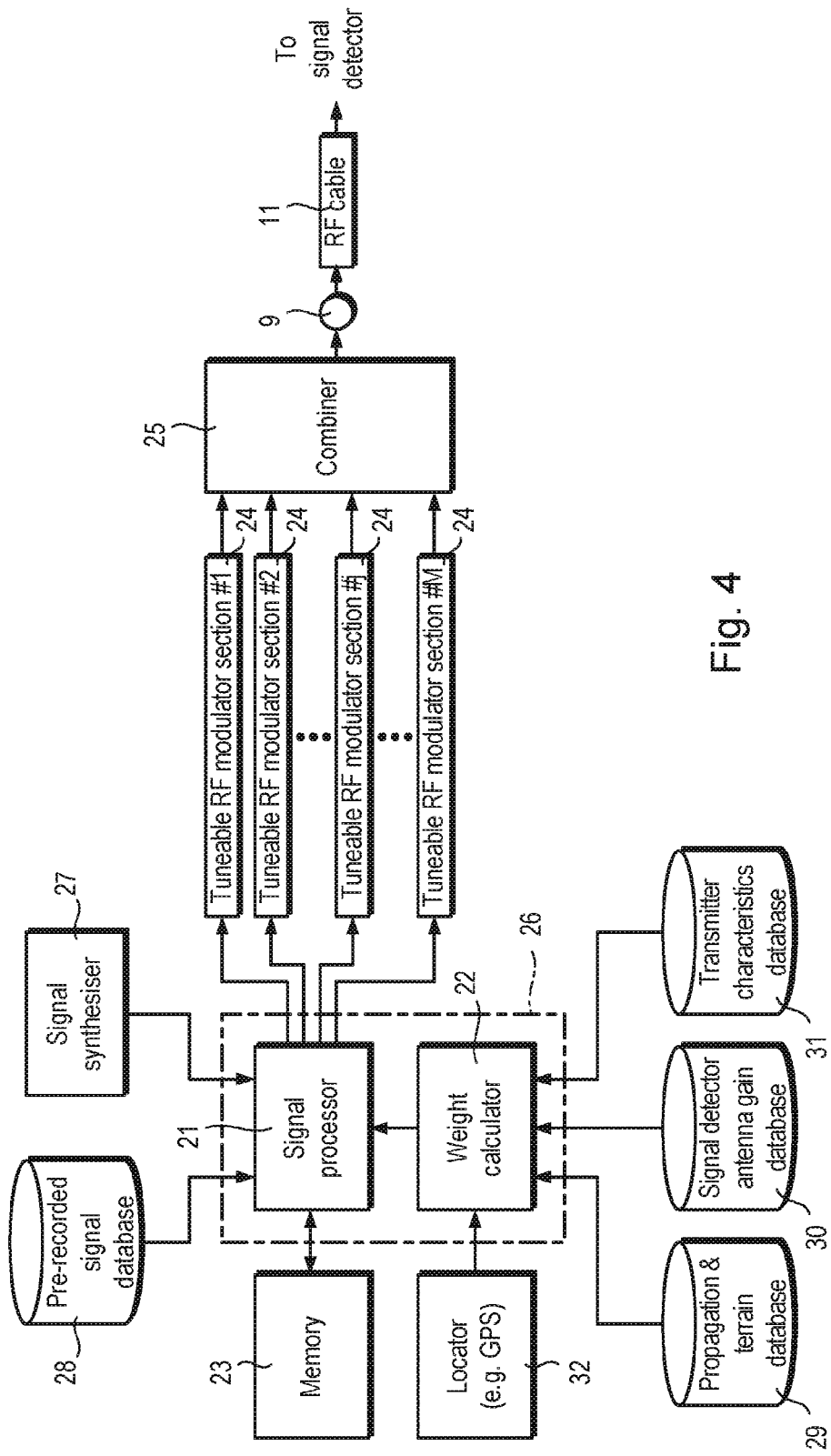
FIG. 4 is a schematic block diagram of an RF signal generator.

Referring to FIG. 4, an example of a signal generator 8 is shown.

The signal generator 8 is able to produce signals corresponding to a large number (e.g. hundreds) of virtual test transmitters 14 (FIG. 3), each having a respective position at a given time.

The signal generator 8 includes a signal processor 21, a weight calculator 22, memory 23, one or more RF signal-generating circuits 24 (herein referred to as "tuneable RF modulator sections") and an RF signal combiner 25. The signal processor 21 and a weight calculator 22 are implemented in software running on one or more processors 26.

In some embodiments, the one or more processors 26 may include one or more programmable central processing units capable of executing code to perform the functions and operations taught herein. In some embodiments, the one or more processors 26 may include one or more circuits or circuitry, for example, field programmable gate arrays configurable or programmable to perform the functions and operations taught herein. In some embodiments, the one or more processors 26 may include a combination of one or more programmable central processing units and one or more configurable circuits or circuitry to perform the functions and operations taught herein.

The signal generator 8 includes first and second sources 27, 28 of digital in-phase (I) and quadrature (Q) data (herein referred to simply as "IQ data") which are used to generate signals corresponding to the virtual test transmitters 14 (FIG. 3).

The first IQ data source 27 takes the form of a synthesiser which calculates and outputs an IQ time series of I and Q data pairs for a given virtual test transmitter 14 (FIG. 3). The synthesiser 27 may be implemented in software running on the one or more processors 26.

The second IQ data source 28 takes the form of a database 23 (herein referred to an "IQ data source database") which stores pre-recorded IQ data. The IQ data can be obtained using an RF signal detector by demodulating a received RF signal to produce analog I and Q components, digitising the analog I and Q components to produce digital I and Q data streams and storing the I and Q data streams. Pre-recorded IQ data may correspond to a single virtual test transmitter 14 (FIG. 3). However, pre-recorded IQ data may correspond to more than one virtual test transmitter 14 (FIG. 3). A recording of RF signals from, say, a distant city or other site having multiple RF sources can be used.

Referring still to FIG. 4, the signal generator 8 includes additional databases 29, 30, 31 and a positioning device 32. A propagation model and terrain database 29 stores data relating to propagation models and terrain. An antenna characteristics database 30 stores data relating to characteristics of the signal detector antenna 2 (FIG. 1). A virtual test transmitter database 31 stores data regarding the virtual test transmitters 14 (FIG. 3) including transmit power, antenna gain and (time-dependent) position. The databases 22, 29, 39 31 may be stored on one or more hard disk drives and/or solid-state hard drives (not shown).

The positioning device 32 is used to provide the position of the signal detector 1. The positioning device 32 takes the form of a global positioning system (GPS) receiver. Additionally or alternatively, an inertial navigation system may be used. The position may be entered manually via a user interface (not shown).

Based on data taken from the databases 29, 30, 31 and the signal detector position, the weight calculator 22 calculates a weight w, typically a real number, for each selected virtual test transmitter 14 (FIG. 3) and supplies the weights w to the signal processor 21.

The signal processor 21 applies the weight w (by multiplication) to a set of synthesised or pre-recorded IQ data to generate a set of weighted IQ data.

The signal processor 21 linearly combines one or more sets of weighted IQ data to form a set of IQ data for a tuneable RF modulator section 24. As will be explained in more detail later, different IQ data can be provided to different tuneable RF modulator sections 24.

Figure 5:
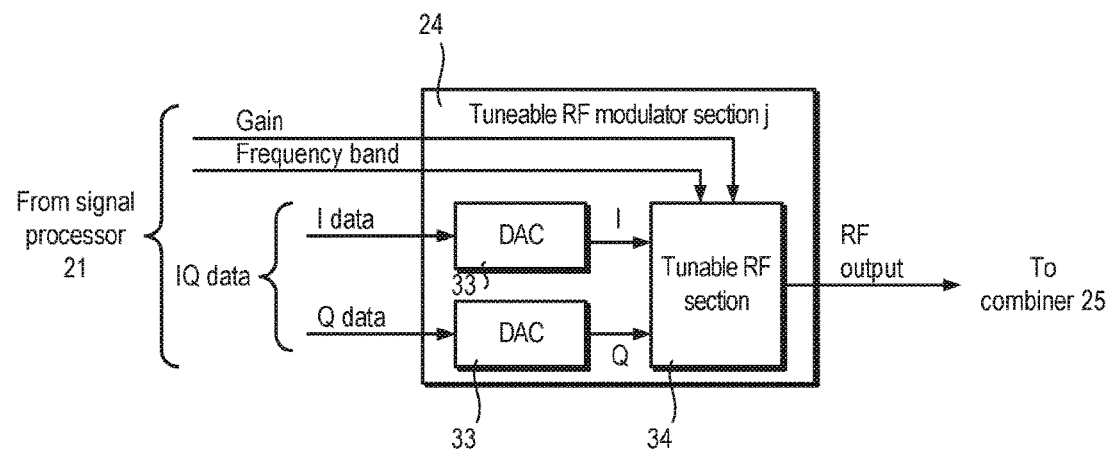
FIG. 5 is a schematic block diagram of a transmitter section of the RF signal generator shown in FIG. 4.

Referring also to FIG. 5, each tuneable RF modulator section 24 includes a pair of digital-to-analog converters (DAC) 33 and a tuneable RF section 34. The signal processor 21 supplies IQ data to the DACs 33 for conversion into corresponding analog I and Q signals. The signal processor 36 also supplies a gain value and frequency band information to the tuneable RF section 34. Frequency bands having the same or different widths can be used.

The tuneable RF section 34 modulates a carrier frequency to produce an intermediate frequency (IF) signal. The tuneable RF section 34 may include a frequency conversion section which may include one or more up-conversion and/or down-conversion paths. A path can be chosen to select the required frequency band.

Other forms of tuneable RF modulator section 24 may be used. For example, modulation can be performed in the digital domain and the resulting digital data stream is converted by a single DAC into an analogue signal. The analogue signal can then be up-converted or down-converted as necessary.

The signal generator 8 can replicate virtual transmitter characteristics (such as modulation waveform, etc.), although this may be limited by the bandwidth and dynamic range of the tuneable RF modulator sections 24.

A scenario, i.e. positions as a function of time and signal characteristics of virtual transmitters 14 (FIG. 3), may be pre-programmed (stored in the virtual transmitter database 31). However, the scenario may be controlled from a remote station.

Figure 6:
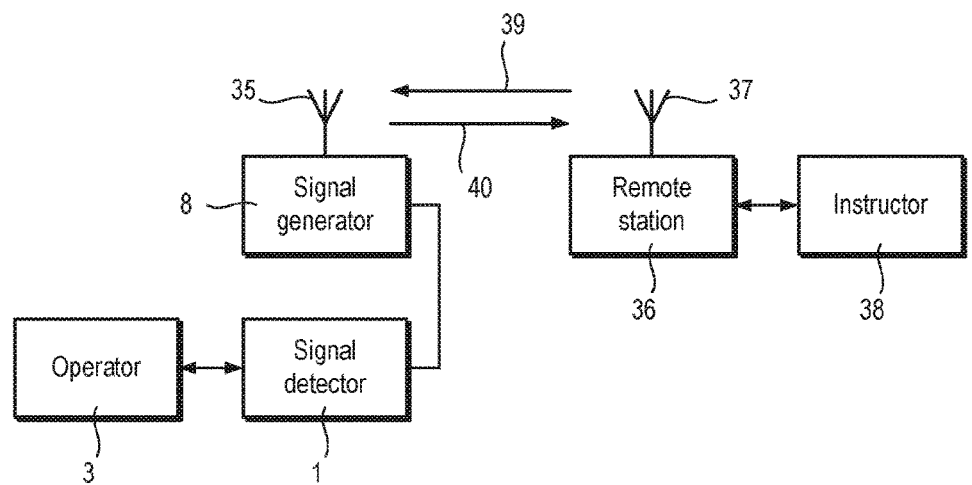
FIG. 6 a schematically illustrates training an operator of an RF signal detector by an instructor using a remote station.
Figure 7:
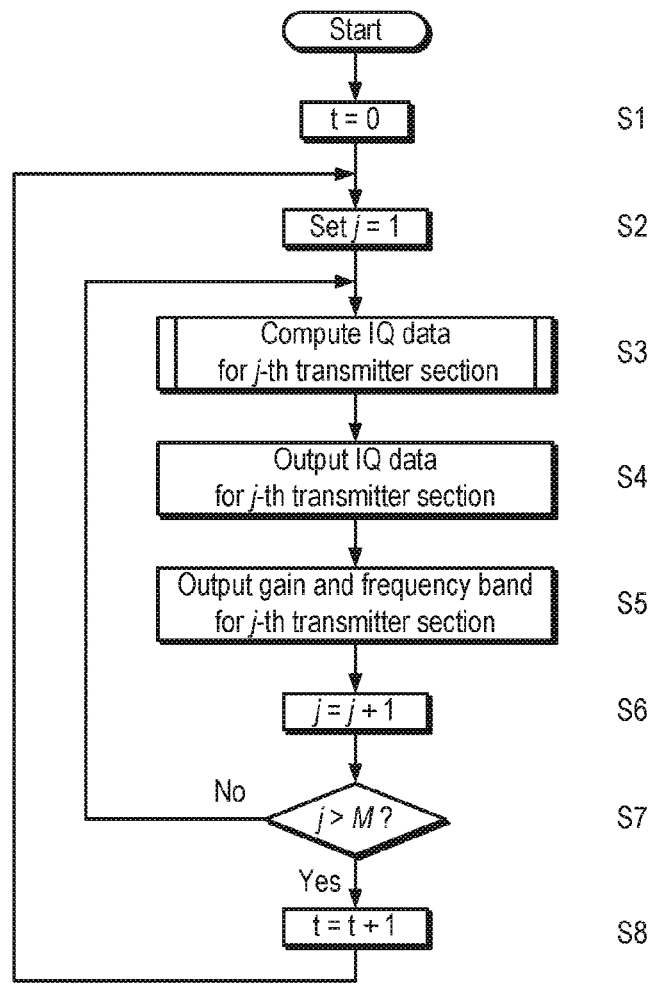
FIG. 7 is a process flow diagram of a process carried out by a processing section in the RF signal generator shown in FIG. 7.
Figure 8:
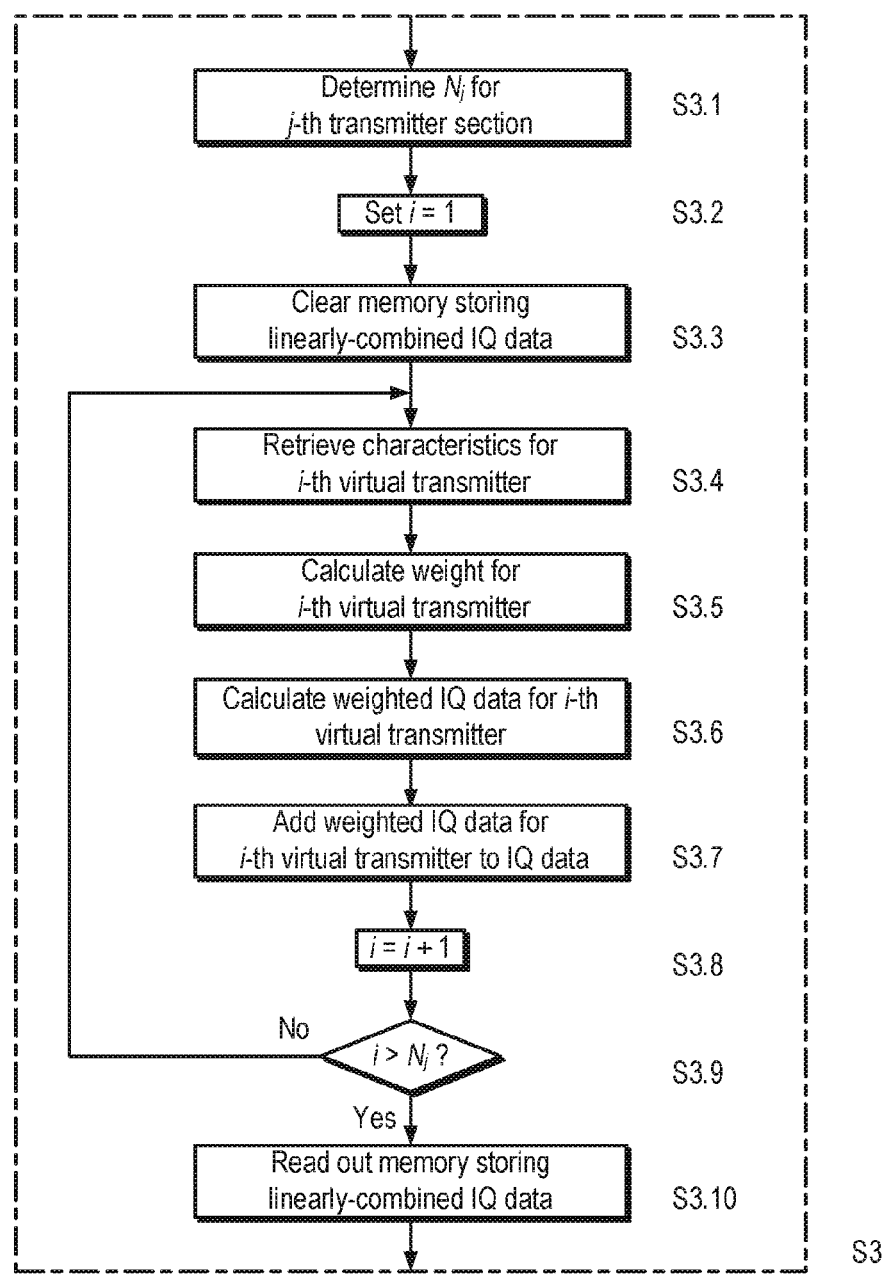
FIG. 8 is a process flow diagram of a process of computing IQ data.

Referring to FIG. 6, an instructor-controlled training system is shown. The system includes the signal detector 1 and signal generator 6 provided with a communications network interface 35 and a remote station 36 provided with a communications network interface 37. The communications network may wireless or wired. The remote station 36 may take the form of a personal computer. The remote station 38 might be used, for example, by an instructor 38 to create dynamic, time-varying signal detection problems for a trainee (i.e. operator 3) by transmitting instructions 39 for controlling the signal generator 8 and to receive telemetric information 40 on his or her performance. This can include setting or adjusting the location of the signal detector 1 and/or the location(s) of the virtual transmitter(s).

Referring to FIGS. 4 to 8, operation of the signal generator 8 will be further described in more detail.

When operation starts, a stream of synthesised or pre-recorded IQ data begins to be buffered in memory 23 (step S1).

The signal processor 21 initialises a tuneable RF modulator section counter, j (step S2).

Taking IQ data from memory 23, the signal processor 21 calculates IQ data in a first time window for a first tuneable RF modulator section 24 (step S3) and outputs a stream of IQ data, a gain value and frequency band information to the first tuneable RF modulator section 24 (steps S4 & S5).

In step S3, the signal processor 21 identifies the virtual test transmitters 14 (FIG. 3) which need to be considered for the current (j-th) section 24 and determines their number, $N_j$ (step S3.1). This is to take into account the fact that certain virtual test transmitters 14 (FIG. 3) may not contribute to the current frequency band. For example, one of the two GPS carrier frequencies may fall into the frequency range of the current tuneable RF modulator section 24 and so virtual test transmitters 14 (FIG. 3) which are not a source or a significant source of RF power in this frequency band can be ignored, while other sources (such as a GPS jammers) are included and counted.

The signal processor 21 initialises a virtual test transmitter counter i (step S3.2) and clears a section of memory 23 reserved for storing a windowed stream of accumulated weighted IQ data, i.e. to form a windowed stream of linearly-combined IQ data (step S3.3).

The weight calculator 22 retrieves the characteristics for the current (i.e. i-th) virtual transmitter 24 and other data from databases 29, 30, 31 (step S3.4). Using this data and the current position, the weight calculator 22 calculates the weight w for the current virtual transmitter and passes this to the signal processor 21 (step S3.5).

The signal processor 21 retrieves a windowed stream of synthesised or pre-recorded IQ data from (a different section of) memory 23, applies the calculated weight to each IQ data value (step S3.6) and adds this windowed stream of weighted IQ data to the section of memory 23 reserved for storing accumulated weighted IQ data (step S3.7).

The signal processor 21 increments the virtual test transmitter counter i (step S3.8) and repeats steps S3.4 to S3.7 for the virtual test transmitter counter 24 until all relevant virtual test transmitters have contributed to accumulated weighted IQ data (step S3.9).

The signal processor 21 then reads out the accumulated weighted IQ data (i.e. linearly-combined IQ data) as a stream of IQ data to the current tuneable RF modulator section 24 (step S3.10).

The signal processor 21 increments the tuneable RF modulator section counter j (step S6) and repeats steps S3 to S5 for the next tuneable RF modulator section 24 in the same time window until respective IQ data, gain values and frequency band information have been provided to all the tuneable RF modulator sections 24 (step S7).

Thus, each tuneable RF modulator section 24 generates a (single-band) RF signal in a time window. The combiner 25 add these signals to form the (multi-band) output RF signal 12 which is presented to the RF output port 9.

Using a directional antenna can help identify and locate an RF source. Accordingly, the signal generator 8 can be adapted to take into account orientation of a directional antenna. Thus, training in direction-finding (DF) techniques can be provided using the signal generator 8. For example, the operator must determine a signal direction by finding the direction of strongest signal.

Referring to FIG. 9, an arrangement is shown which includes a directional antenna (or a substitute device) 41 and a sensing device 42 attached to the antenna 41 capable of measuring instantaneous angle(s) of orientation of the antenna 41 and outputting antenna orientation data 43. The sensing device 42 may include MEMS-type accelerometers and/or a magnetic compass. If an antenna is used (i.e. a substitute device is not used), then no RF signal is taken from the antenna.

The antenna orientation data 43 includes an azimuthal angle (or "bearing"). The antenna orientation data 43 may include an angle of elevation. This can be used to train the operator to find an elevated (or lowered) or airborne RF sources. The antenna orientation data 43 may include axial rotation. This can be used to train the operator to identify polarized sources.

As shown in FIG. 9, the signal generator 8 receives the antenna orientation data 43 via input 44. The weight calculator 22 (FIG. 4) takes into account the antenna orientation data when calculating weights. In particular, weight calculator 22 (FIG. 4) uses the antenna orientation data together with antenna gain characteristics stored in the antenna characteristics database 30 (FIG. 4).

Thus, the signal generator 8 can mimic the effect on the strengths of the signals received from virtual transmitters that would have been produced by the actual directional antenna gain at the measured orientation of the device. The operator can respond to the signal indicated by the signal detector 1 by moving the directional antenna 41.

The antenna or substitute device 41 may be handheld. However, the antenna need not be handheld but can be any form of rotatable directional antenna, for example, mounted on a vehicle or fixed platform.

Information relating to movement of the signal detector 1 and/or antenna 41 over time can be recorded and may be stored in the signal generator 8 and/or transmitted via a wireless data interface (not shown) to a remote station, e.g. for use by an instructor.

As shown in FIG. 2, a single signal detector 1 can be used in conjunction with a single signal generator 8. However, the system may include more than one signal detector 1 and a corresponding number of signal generators 8 that are synchronised and so present signals from the same set of virtual transmitters to each signal detector 1.

This can be used for team training, where members of a team co-operate to detect and identify multiple virtual signals.

Techniques used by teams include carrying out angle of arrival (AOA) direction-finding measurements from multiple locations to triangulate a transmitter location.

Signal detectors 1 and signal generators 8 may also be used for training operators at a control centre (not shown). Pairs of signal detector detectors 1 and signal generators 8 may report measurements to a remote control centre and the operators at the control centre (not shown) can interpret the measurements.

Another technique, used by individuals or teams, is proximity detection using power on arrival (POA). This technique is particularly useful when used in confined space, such as a building. In this technique, an RF source is located by approaching it closely enough to maximise power received.

It is also possible for members of a team, who are able to communicate with each other, to be trained in time difference of arrival (TDOA) transmitter location, using signal generators 8.

To make TDOA measurements, a signal detector 1 needs an IQ reference sequence, for example, in the form of sampled time series, as the basis for correlation with the received signal. In existing systems, such reference sequences are sent over wireless broadband communications links. However, in the present system, reference sequences can be sent from the signal generators 8, which already has IQ sequence information for the virtual transmitter, to the signal detector 1.

Figure 10:
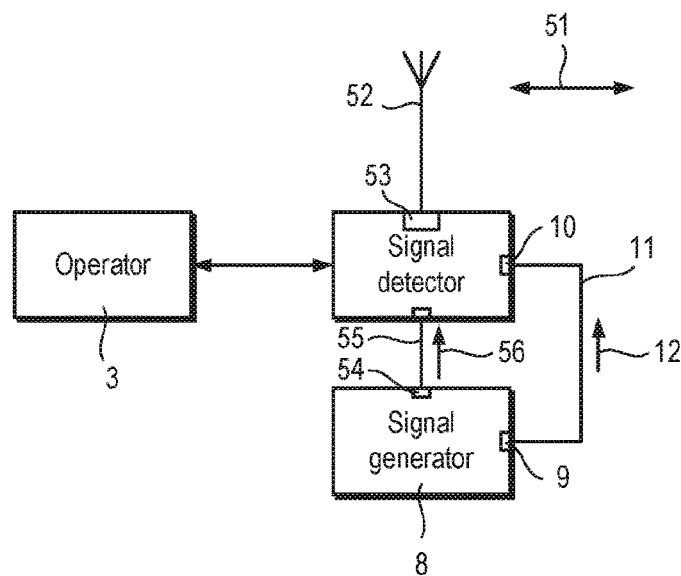
FIG. 10 schematically illustrates a RF signal generator being used in time difference of arrival arrangement.

Referring to FIG. 10, a TDOA arrangement is shown.

Correlation measurement data 51 are exchanged with other team members via a communications antenna 52 and a low-bandwidth (i.e. not broadband) data communications interface 53 in the signal detector 1.

The signal generator 8 includes a data communications interface 54 and a wired connection 55 to provide the reference sequences 56 using, for example, short-range Ethernet.

Referring also to FIG. 3, the signal generator 8 sends an RF signal 12 to the signal detector 1, simulating the signal that would have been received from a virtual test transmitter 14 including the relevant time delay corresponding to the distance between the virtual test transmitter 14 and the signal detector 1.

Figure 11:
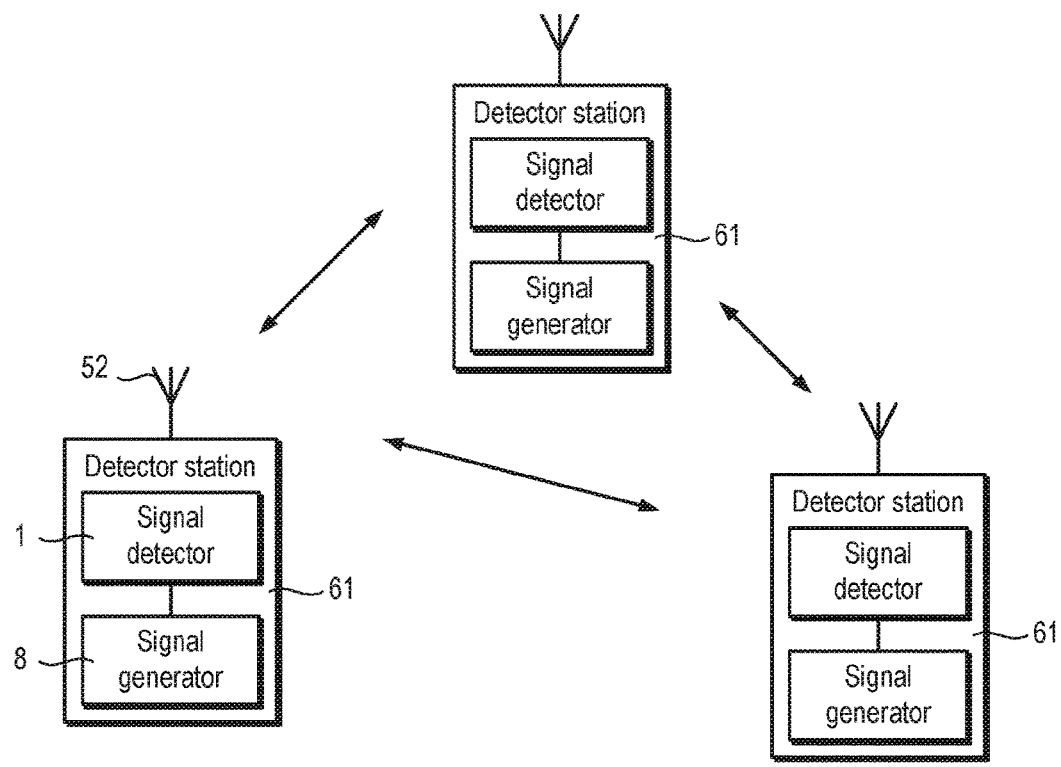
FIG. 11 schematically illustrates exchanged of signals between detector stations for a time difference of arrival measurement.

Referring also to FIG. 11, correlation measurements made at various (at least three) detector stations 61 are shared between team members over low data rate wireless communications links, as are the locations of the detector stations 61. A TDOA location estimation calculation may then be performed at any of the detector stations that has received a full set of correlation results and associated detector locations. The behaviour of the signal generators can be synchronised using GPS.

Thus, using signal generators 8 can help to reduce greatly the wireless bandwidth required for transmission between detector stations.

As explained earlier, the signal generator 8 may be incorporated into a signal detector 1 to form a single unit (not shown). Thus, an operator may switch the signal detector 1 into "simulation mode" in which the unit is programmed to output pre-defined signals.

The signal generator portion of the unit may provide an RF signal to the signal detector portion of the unit in the analog domain.

Alternatively, the signal generator portion of the unit may provide digital signals to the signal detector portion of the unit in the digital domain. In this case, digital signals can be "injected" into a digital path near the detector output (such as a processor input, prior to the data or representation of the data being displayed).

A further use of signal injection in the digital domain is the simulation of TDOA measurements. Signals can be injected into a central calculation point for transmitter location estimation.

All the techniques hereinbefore described may be combined in a single training or assessment exercise, to include multiple in-field individuals and controllers at a central point, all overseen by an instructor who can determine the signal scenarios presented to the trainees, and measure their performance.

The examples hereinbefore described use wired connections to avoid the need for wireless RF test transmitters 4 (FIG. 1).

However, the RF signal 12 (FIG. 2) can be wirelessly transmitted from the signal generator 8 (FIG. 2) using an antenna (not shown).

A signal generator 8 which wirelessly transmits an RF signal (FIG. 2) may also serve as a geo-location beacon for use by receivers when GPS is not available.

For example, wireless transmission of an RF signal (FIG. 2) from a signal generator 8 can be used to synchronise a network of signal detectors 1, such as RFeye® nodes, by providing a timing beacon in the absence of effective GPS signals.

Wireless transmission of an RF signal (FIG. 2) from a signal generator 8 can be used for tracking of assets, such as vehicles, by placing a signal generator 8 on each asset. Surrounding receiver, such as RFeye® nodes, can locate the asset using direction-finding techniques.

It will be appreciated that many modifications may be made to the embodiments hereinbefore described.

For example, the signal detector may be a digital or analog detector. The signal detector may include a display for displaying a signal.

The signal generator can be used be to test signal detecting equipment.

The invention claimed is:

1. Apparatus comprising:
   a positioning device for providing a location of a radio frequency (RF) signal detector or a location of an antenna associated with the RF signal detector;
   an orientation determining device for providing an orientation of the antenna associated with the RF signal detector;
   an interface for receiving an instruction modifying the location;
   at least one processor configured to generate a set of in-phase and quadrature (IQ) data based on at least one set of weighted IQ data, each set of weighted IQ data having a respective weight; and
   a circuit configured to generate an RF signal using the set of IQ data;
   wherein the at least one processor is configured to calculate each respective weight in dependence upon the location and the orientation.

2. Apparatus according to claim 1, wherein the at least one processor is configured to calculate each respective weight in dependence upon location of a respective wireless RF transmitter being simulated.

3. Apparatus according to claim 1, wherein the at least one processor is configured to calculate each respective weight in dependence upon orientation of the antenna.

4. Apparatus according to claim 1, wherein the antenna is a handheld antenna.

5. Apparatus according to claim 1, wherein the antenna comprises an orientation determining device.

6. Apparatus according to claim 1, wherein the antenna is a dummy antenna.

7. Apparatus according to claim 1, wherein the at least one processor is configured to generate a set of IQ data based on at least two sets of weighted IQ data by linearly combining the at least two sets of weighted IQ data.

8. A system comprising:
   at least two apparatuses according to claim 7; and
   at least two signal detectors;
   wherein each signal detector is in wired connection with a respective apparatus, wherein each apparatus is configured to simulate the same environment.

9. Apparatus according to claim 1, further comprising:
   a first database storing data relating to propagation models and terrain;
   wherein the at least one processor is configured to calculate each respective weight in dependence upon a propagation model and terrain.

10. Apparatus according to claim 1, further comprising:
    a second database storing data relating to antenna characteristics of a given signal detector;
    wherein the at least one processor is configured to calculate each respective weight in dependence upon said antenna characteristics.

11. Apparatus according to claim 1, further comprising:
    a third database storing data relating to characteristics of a plurality of RF transmitters;
    wherein the at least one processor is configured to calculate each respective weight in dependence upon characteristics of the respective RF transmitter.

12. Apparatus according to claim 11, wherein the characteristics include a transmit power.

13. Apparatus according to claim 12, wherein the location depends on time.

14. Apparatus according to claim 1, further comprising:
    a synthesiser configured to generate a set of IQ data;
    wherein the at least one processor is configured to receive the set of IQ data from the synthesiser and to apply a corresponding weight.

15. Apparatus according to claim 1, further comprising:
    a fourth database storing at least one set of IQ data;
    wherein the at least one processor is configured to retrieve the set of IQ data from the fourth database and to apply a corresponding weight.

16. Apparatus according to claim 1, wherein the circuit comprises:
    a pair of digital-to-analog converters (DACs);
    wherein the DACs are configured to receive the IQ data and to output analog I and Q signals.

17. Apparatus according to claim 1, wherein the circuit comprises:
    a modulator;
    wherein the modulator is configured to receive the analog IQ signals from DACs and to modulate the RF carrier signal to provide an intermediate signal.

18. Apparatus according to claim 1, wherein the circuit comprises:
    a set of at least one up-converter and/or down-converter, one of which is selectable so as to allow up-conversion or down-conversion of the intermediate signal.

19. Apparatus according to claim 1:
    wherein the set of IQ data is a first set of IQ data, the circuit is a first circuit which is configured to receive the first set of IQ data, a first gain and a first frequency band and to generate a first RF signal in the first frequency band, and
    wherein the at least one processor configured to generate second set of IQ data based on at least one set of weighted IQ data:
    a second circuit configured to receive the second set of IQ data, a second gain and a second frequency band which is different to the first frequency band and to generate a second RF signal in the second frequency band.

20. Apparatus according to claim 19, further comprising:
    an RF signal combiner;

wherein the combiner is configured to receive first and second RF signals and to combine the signals to provide a multi-band RF signal.

21. Apparatus according to claim 20, further comprising:
a port for supplying the multi-band RF signal to a wired connection.

22. Apparatus according to claim 1, further comprising:
a port for supplying the RF signal to a wired connection.

23. Apparatus according to claim 1, further comprising:
an interface configured to receive instructions from a remote location for controlling operation of the apparatus.

24. Apparatus according to claim 1, further comprising:
an interface configured to provide information on performance.

25. Apparatus according to claim 1, further comprising:
an interface configured to provide a reference sequence for supplying to a signal detector; and
the signal processor is configured to generate the set of IQ data so as to simulate a signal that would have been received from a virtual test transmitter including a time delay corresponding to a distance between the virtual test transmitter and the signal detector.

26. A system comprising:
apparatus according to claim 1; and
a signal detector;
wherein the signal detector is in wired connection with the apparatus.

27. A system according to claim 26, wherein the signal detector comprises a spectrum analyser.

28. A system according to claim 26, wherein the signal detector and apparatus are comprised in a single unit.

29. A system according to claim 26, wherein the signal detector includes an interface for receiving instruction from a remote location for controlling operation of the apparatus and/or signal detector, and/or for transmitting information on performance.

* * * * *